US012616338B2

(12) United States Patent
Claesson et al.

(10) Patent No.: US 12,616,338 B2
(45) Date of Patent: May 5, 2026

(54) CONVECTION DEEP FAT FRYER HEATING SYSTEM

(71) Applicant: FRYMASTER LLC, New Port Richey, FL (US)

(72) Inventors: Jan Claesson, Land O' Lakes, FL (US); Daryl G. Erbs, Tarpon Springs, FL (US); Douglas S. Jones, New Port Richey, FL (US)

(73) Assignee: FRYMASTER LLC, Shreveport, LA (US)

( * ) Notice: Subject to any disclaimer, the term of this patent is extended or adjusted under 35 U.S.C. 154(b) by 1223 days.

(21) Appl. No.: 17/361,616

(22) Filed: Jun. 29, 2021

(65) Prior Publication Data

US 2022/0330754 A1     Oct. 20, 2022

Related U.S. Application Data

(63) Continuation-in-part of application No. 17/235,440, filed on Apr. 20, 2021, now abandoned.

(51) Int. Cl.
*A47J 37/12*          (2006.01)

(52) U.S. Cl.
CPC ....... *A47J 37/1233* (2013.01); *A47J 37/1242* (2013.01); *A47J 37/1285* (2013.01); *A47J 37/1295* (2013.01)

(58) Field of Classification Search
CPC .... A47J 37/12; A47J 37/1233; A47J 37/1242; A47J 37/1285; A47J 37/1295; A47J 37/1257
USPC .......................................................... 99/403
See application file for complete search history.

(56) References Cited

U.S. PATENT DOCUMENTS

| | | | |
|---|---|---|---|
| 2,053,568 A | 9/1936 | Levin | |
| 2,212,905 A | 8/1940 | Tota | |
| 2,243,661 A | 5/1941 | Tota | |

(Continued)

FOREIGN PATENT DOCUMENTS

| | | | | |
|---|---|---|---|---|
| JP | H099896 A | * | 1/1997 | |
| WO | 2007-055980 A2 | | 5/2007 | |
| WO | WO-2011002711 A1 | * | 1/2011 | ............... F24H 1/32 |

OTHER PUBLICATIONS

International Preliminary Report on Patentability (IPRP) dated Feb. 12, 2024 for PCT Appl. No. PCT/US2022/024540.

(Continued)

*Primary Examiner* — Steven W Crabb
*Assistant Examiner* — Alba T Rosario-Aponte
(74) *Attorney, Agent, or Firm* — Ohlandt, Greeley and Perle, LLP.

(57) ABSTRACT

A heating system for a fluid includes a double helical coil of continuous tube, a burner, and a containment structure. The double helical coil has an inlet and an outlet disposed at a bottom end and a plurality of external radial fins spaced apart along a length thereof. The burner is centered in the double helical coil and disposed above the inlet and the outlet. The containment structure has a closed bottom end and a flue opening at an upper end. The containment structure is positioned above the inlet and the outlet to enclose the double helical coil and the draft-type burner. The burner heats the continuous tube to evenly transfer heat to the fluid while the fluid flows through the continuous tube from the inlet to the outlet.

21 Claims, 7 Drawing Sheets

(56) References Cited

U.S. PATENT DOCUMENTS

| | | | | |
|---|---|---|---|---|
| 2,823,652 | A | * | 2/1958 | Mader .................... F22B 21/26 |
| | | | | 122/250 R |
| 3,097,589 | A | | 7/1963 | Moore |
| 3,977,390 | A | | 8/1976 | Fogel et al. |
| 4,049,364 | A | | 9/1977 | Ross |
| 4,668,390 | A | * | 5/1987 | Hurley ............... A47J 37/1233 |
| | | | | 210/DIG. 8 |
| 4,704,290 | A | * | 11/1987 | Fritzsche ........... A47J 37/1233 |
| | | | | 99/403 |
| 5,365,888 | A | * | 11/1994 | Aronov .................. F28D 7/024 |
| | | | | 122/18.4 |
| 5,680,811 | A | * | 10/1997 | Highnote ........... A47J 37/1233 |
| | | | | 210/DIG. 8 |
| 6,296,480 | B1 | * | 10/2001 | Anderson ................ F24H 1/44 |
| | | | | 432/223 |
| 8,646,382 | B2 | | 2/2014 | Highnote |
| 9,629,502 | B2 | | 4/2017 | Highnote |

OTHER PUBLICATIONS

Extended European Search Report dated Mar. 26, 2025 for European Application No. 22792223.4.

* cited by examiner

CONVECTION DEEP FAT FRYER HEATING SYSTEM

CROSS REFERENCE TO RELATED APPLICATIONS

This application is a continuation in part of U.S. patent application Ser. No. 17/235,440 titled Convection Deep Fat Fryer, filed Apr. 2, 2021, which is incorporated by reference herein in its entirety.

BACKGROUND OF THE DISCLOSURE

1. Field of the Disclosure

The present disclosure is directed to deep fat fryers. Particularly, the present disclosure relates to a convection type deep fat fryer using cooking oil that is heated by a heating system external to the cooking oil vat. More particularly, the present disclosure relates to such a heating system that circulates oil from the cooking oil vat, through a heat exchanger external to the cooking oil vat, and back to the cooking oil vat, in a continuous loop.

2. Description of Related Art

Convection fryers are desirable over standard, static type deep fat fryers for many reasons. Convection fryers can apply a much higher heat flux in a smaller footprint than is possible with a fryer that heats the cooking oil using the surfaces of the fry vat or cooking oil vat in contact with the cooking oil. This allows the convection fryer to have a smaller footprint for a given cooking capacity. The higher heating power and the movement of the oil through the food being cooked enables the convection fryer to cook larger loads with less temperature drop at the beginning of a cooking cycle and recover or adjust to a new temperature, faster than a standard fryer with less heating power. The high heating power also allows faster recovery from a setback temperature to a cooking temperature, making it more likely the operator will set back the oil temperature, thereby saving energy and increasing oil life.

Many attempts have been made to design a reliable and efficient convection frying cooking system. Among other drawbacks, these prior attempts have had problems with various parts, resulting in low reliability or failures.

For example, some prior convection fryers placed the heat exchange surface inside the cooking vat. When the heat exchanger is in the cooking vat, the exchanger takes up additional space increasing vat volume. The shape of the exchanger also makes the vat difficult to clean.

Other prior convection fryers placed the heat exchange surface external the cooking oil vat and used atmospheric burners. These systems have experienced poor reliability due to uneven heat flux over the heat exchanger surfaces leading to hot spots which cause oil degradation. Other failures have occurred due to multiple joints in the tubing sections within the heat exchanger being exposed to the burner combustion gas. Other failures have occurred due to the oil circulation path having areas that allowed or facilitated accumulation of particles and cooking oil deposits. Accumulation over time leads to flow blockage and heat exchange failure.

Heating systems of prior convection fryers use a large amount of the cabinet space under the cooking vat making it difficult or impossible for other systems to be integrated into the fryer, for example a filter system or automated top-off reservoir.

Accordingly, it has been determined by the present disclosure that there is a continuing need for a convection fryer that overcomes, alleviates, and/or mitigates one or more of the aforementioned and other deleterious effects of prior devices.

SUMMARY OF THE DISCLOSURE

The present disclosure provides convection type deep fat fryer and a heating system that circulates oil from the cooking oil vat, through a heat exchanger external to the cooking oil vat, and back to the cooking oil vat, in a continuous loop.

A heating system for a fluid includes a double helical coil of continuous tube, a burner or forced-draft type burner, and a containment structure. The double helical coil has an inlet and an outlet disposed at a bottom end and a plurality of external radial fins spaced apart along a length thereof. The burner or forced-draft type burner is centered in the double helical coil and disposed above the inlet and the outlet. The containment structure has a closed bottom end and a flue opening at an upper end. The containment structure is positioned above the inlet and the outlet to enclose the double helical coil and the burner or forced-draft burner. The burner or forced-draft burner heats the continuous tube to evenly transfer heat to the fluid while the fluid flows through the continuous tube from the inlet to the outlet.

The present disclosure further provides a convection type deep fat fryer having such a heating system.

The above and other objects, features, and advantages of the present disclosure will be apparent and understood by those skilled in the art from the following detailed description, drawings, and accompanying claims. As shown throughout the drawings, like reference numerals designate like or corresponding parts.

DETAILED DESCRIPTION OF THE DISCLOSURE

Figure 1:
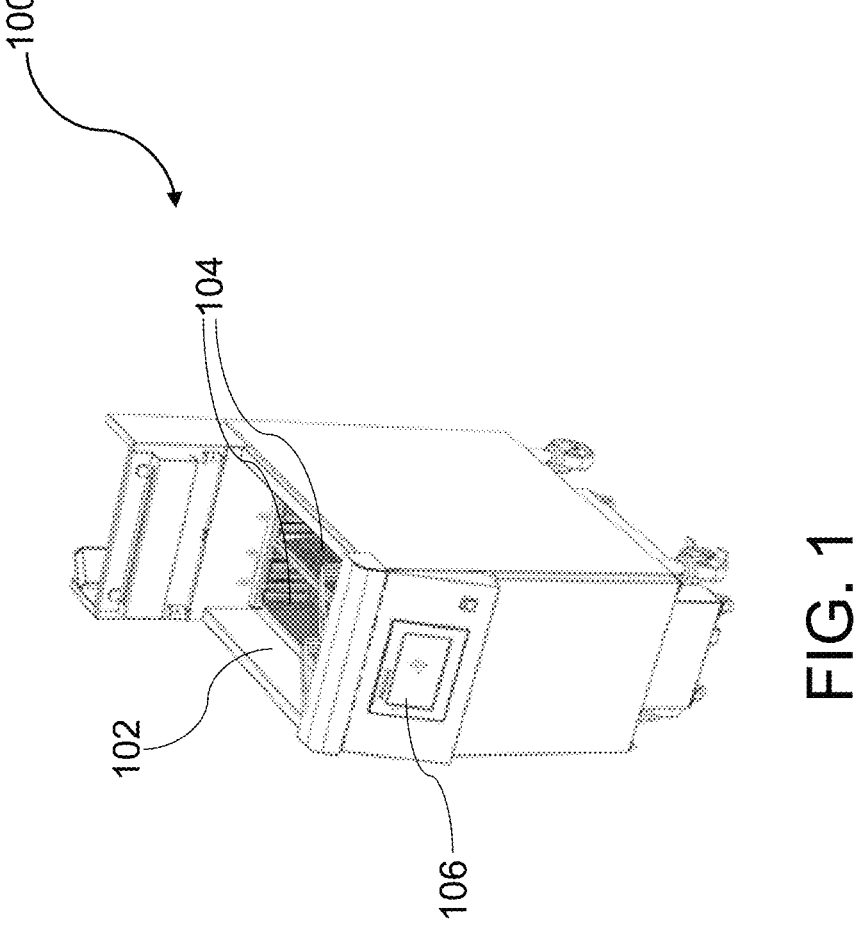
FIG. 1 is a front perspective view of a single vat convection deep fat fryer according to the present disclosure.

A convection type deep fat fryer generally represented by reference numeral 100 of the present disclosure is shown in FIG. 1 ("fryer 100"). Fryer 100 is a single vat fryer having a single oil vat 102. Fryer 100 is shown with two fryer baskets 104 for holding food and has a touchscreen control interface 106. Touchscreen control interface 106 comprises logic and circuitry for operably controlling of fryer 100.

Figure 2:
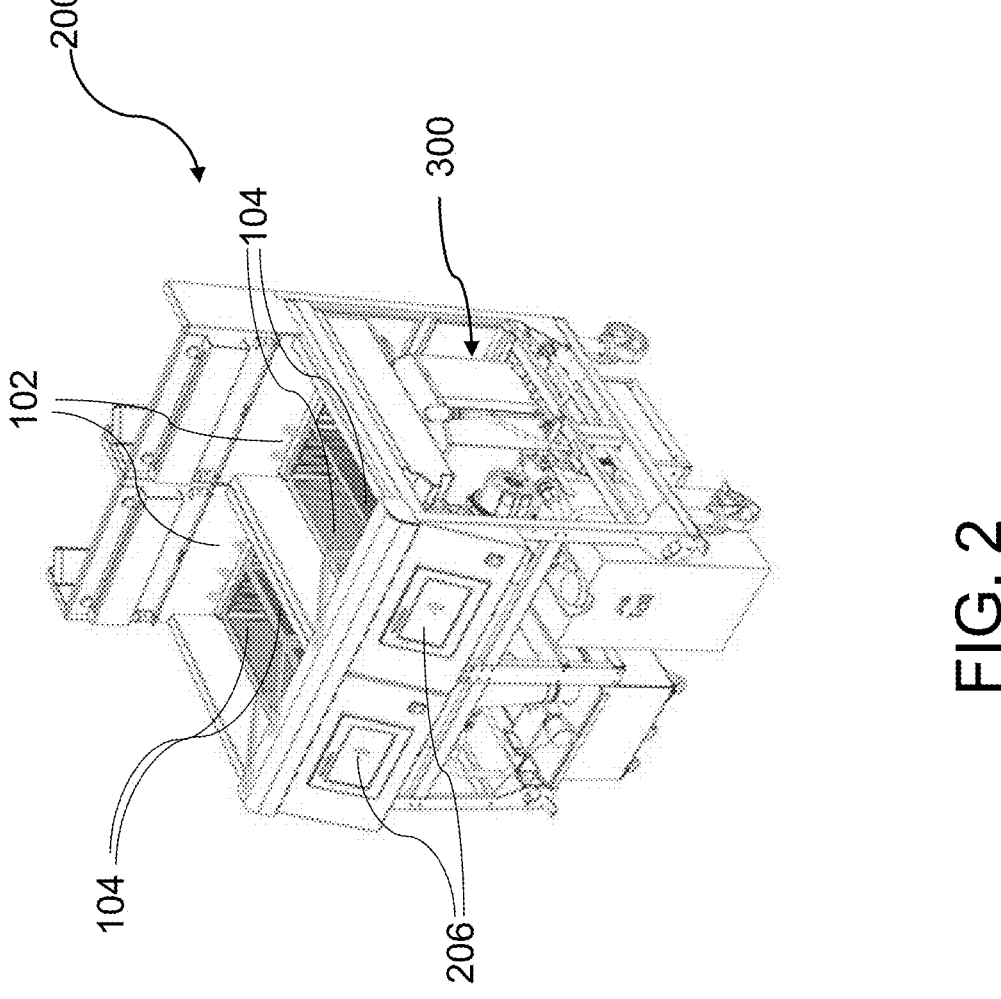
FIG. 2 is a front perspective view of a two-vat convection deep fat fryer with side and front panels removed according to the present disclosure.

A convection type deep fat fryer like fryer 100 but having dual oil vats 102 is shown in FIG. 2. FIG. 2 shows fryer 200 with its side panels removed to show internal components. Fryer 200 has two oil vats 102 rather than just one and is shown holding four fryer baskets 104. Fryer 200 is equipped with one or more touchscreen control interfaces 206 to independently control each oil vat 102.

Fryer 100 has a heating system 300. Fryer 200 can include one or more heating systems 300.

Figure 3:
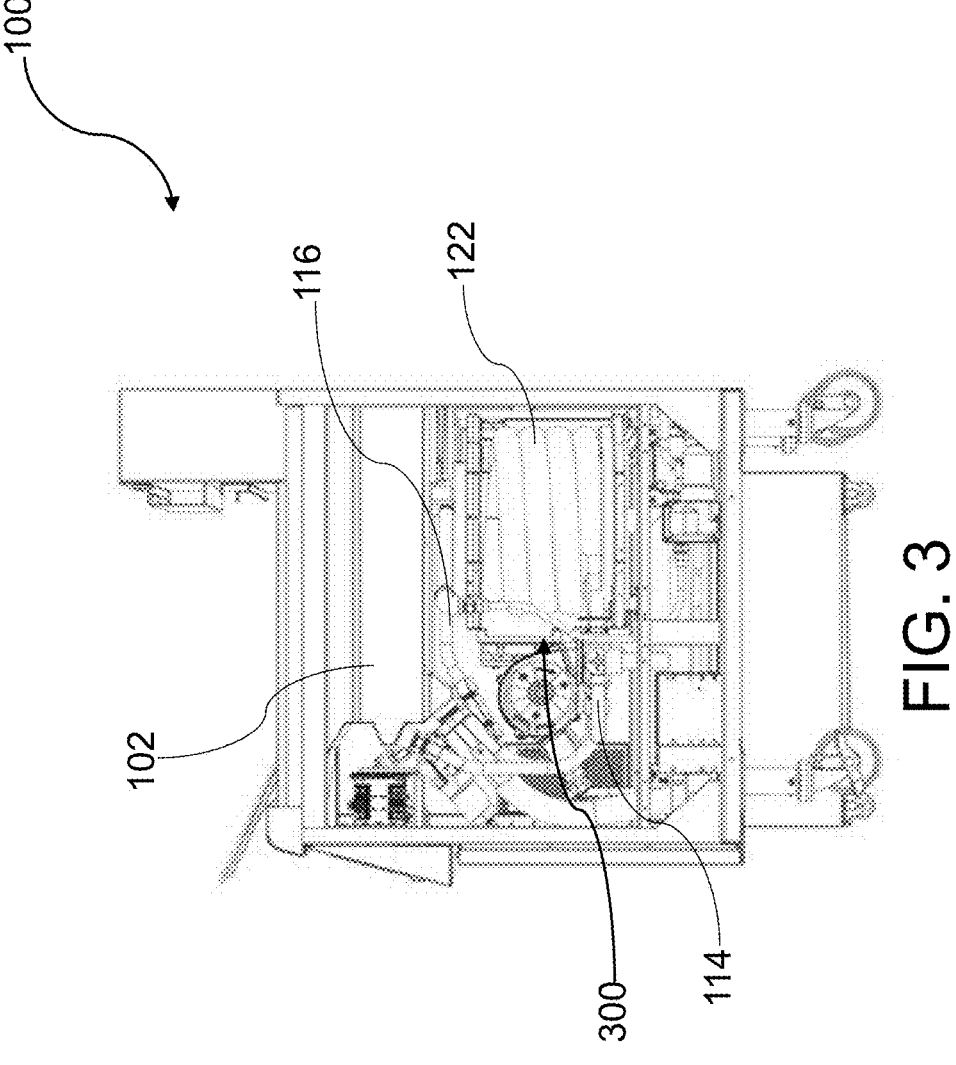
FIG. 3 is a right-side view of the fryer of FIG. 1 with the side panels removed and the outer casing of the heat exchanger removed.
Figure 4:
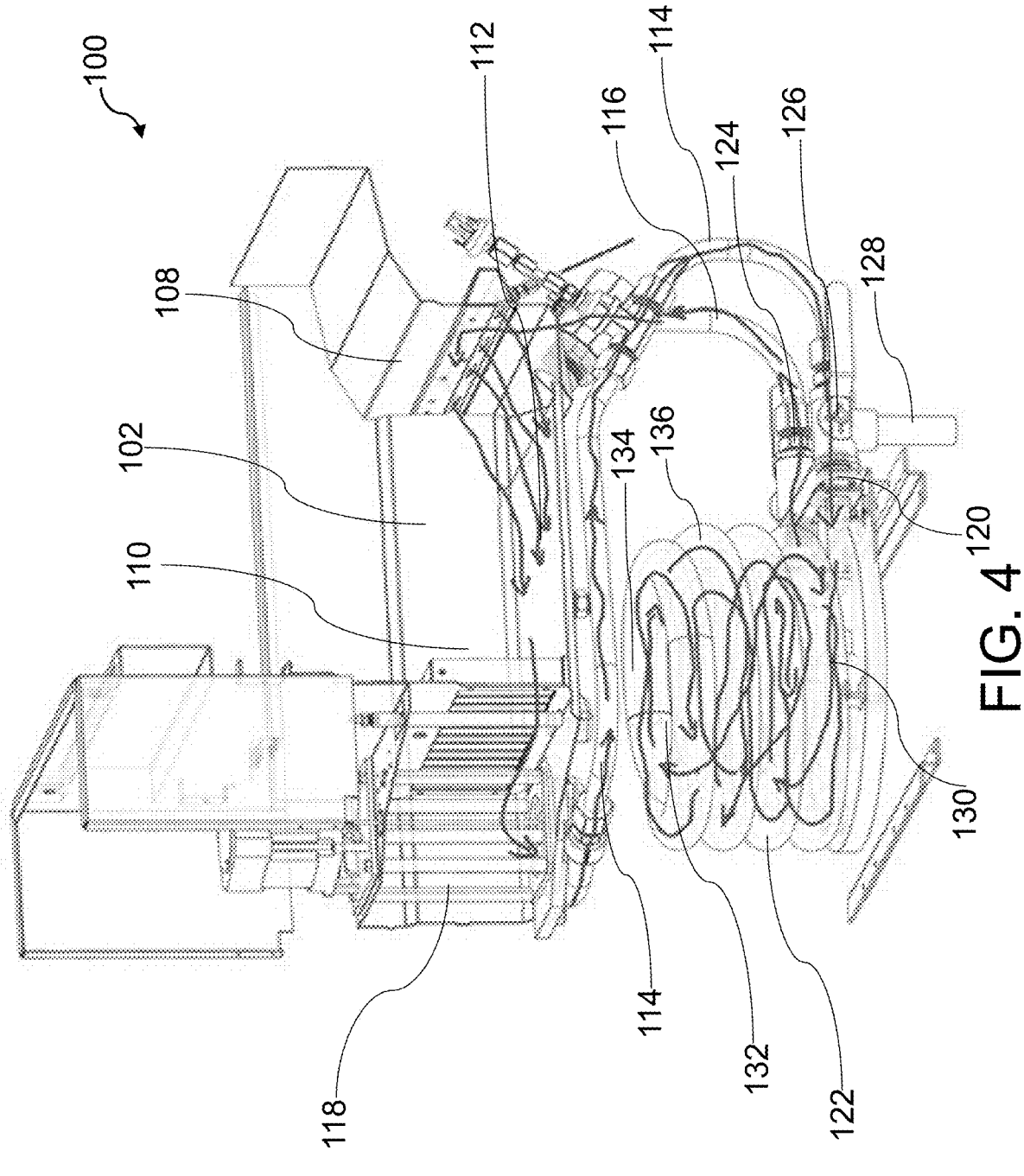
FIG. 4 is a left-rear isometric see through view of the fryer of FIG. 1 showing oil circulation components and flow lines illustrating a flow path of the circulating oil.

Referring to FIGS. 3 and 4, there are shown, respectively, a right-side view of fryer 100 with heating system 300, and a left-rear isometric see through view of fryer 100 with oil circulation components. In FIG. 3, certain features are hidden to reveal the internal components. In FIG. 4, flow lines illustrate a flow path of circulating oil.

Oil vat 102 of fryer 100 has an upstream end 108 and a downstream end 110, each disposed at opposite ends of the oil vat. Heating system 300 provides heated oil to upstream end 108. Cooking oil thus flows or circulates in oil vat 102 from upstream end 108 to downstream end 110, as indicated by arrow 112.

An oil line 114 provides fluid communication from a pump 118 at downstream end 110 to an inlet 120 of a heat exchanger 122. Oil line 114 is a conduit for cooking oil and can be tubing, for example.

An oil line 116 provides fluid communication from an outlet 124 of heat exchanger 122 to upstream end 108. Oil line 116 is a conduit for cooking oil and can be tubing, for example.

Inlet 120 and outlet 124 are positioned at a lowermost bottom end of heat exchanger 122.

Operation during a cooking cycle or while the fryer is idling will now be described. Idling can be, for example when oil is being kept hot but circulating at a lower rate.

In operation, cooking oil is circulated from oil vat 102 through pump 118, through oil line 114 and into heat exchanger 122 by inlet 120, through heat exchanger 122, out of heat exchanger 122 by outlet 124, through oil line 116, and back into oil vat 102. As oil flows through heat exchanger 122, the oil is heated. Thus, oil flowing into heat exchanger 122 will be at a temperature lower than oil exiting heat exchanger 122.

A flow path 130 of oil is indicated by the arrows. Upon entering heat exchanger 122 at inlet 120, flow path 130 extends along an inner spiral tubing section 132 up to an uppermost tubing section 134 of heat exchanger 122 and then down an outer tubing section 136 of heat exchanger 122 and exits outlet 124.

Flow path 130 continues along oil line 116, into oil vat 102, from upstream end 108 to downstream end 110, to pump 118, to oil line 114, and back into heat exchanger 122 at inlet 120.

A flow path in an opposite direction than shown is also possible.

Valves 126 are located at inlet 120 and outlet 124 to facilitate draining heat exchanger 122. When draining or cleaning is desired or required, for example, valves 126 can be opened to create a flow path for oil to flow by gravity from heat exchanger 122 out through each drain tubes 128 (only one is shown). Because of the geometry of heat exchanger 122, two drains, one at each of inlet 120 and outlet 124, are necessary to completely drain heat exchanger 122. Simultaneously, each drain tube 128 drains half of heat exchanger 122 when both valves 126 are opened to allow all the oil in the heat exchanger to drain out. Advantageously, the entire heat exchanger can be easily and quickly drained into the filtration pan when maintenance cleaning or boil-out is necessary.

Figure 5:
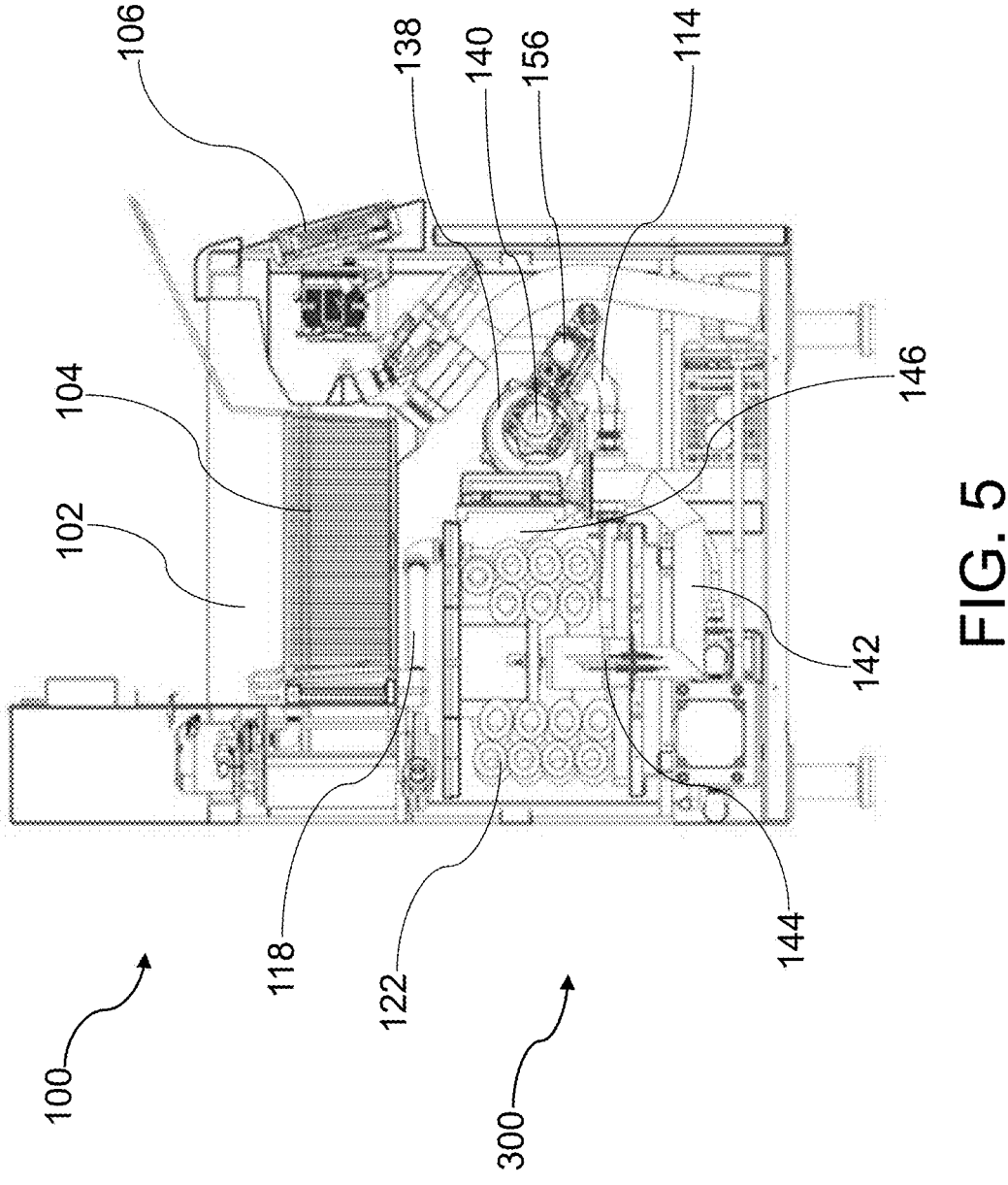
FIG. 5 is a left side cut-away view of the fryer of FIG. 1.
Figure 6:
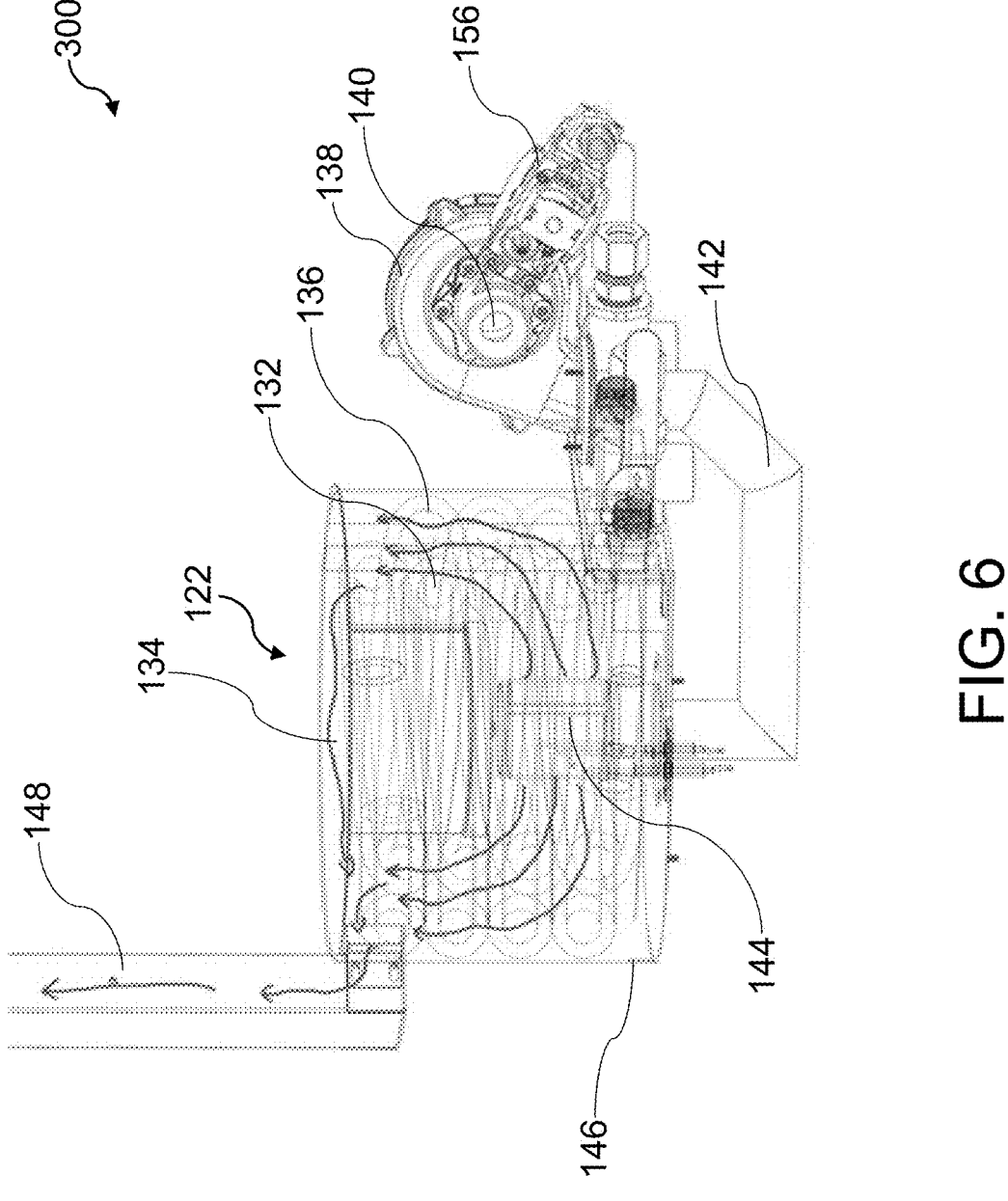
FIG. 6 is a left side view of a burner assembly showing a flow path of combustion products.

Reference is now made to FIG. 5 showing a left side cut-away view of fryer 100 and FIG. 6 showing heating system 300. Heating system 300 includes a blower 138, a venturi 140, a pipe 142, a burner 144, a containment structure 146, heat exchanger 122, and a flue 148.

Heat exchanger 122 can be a double helix tube heat exchanger or a double helix fin-and-tube heat exchanger.

Heat exchanger 122 is formed of a continuous tube coil that includes inner spiral tubing section 132, uppermost tubing section 134, and outer spiral tubing section 136. As used in this context, continuous means the tube does not have any joints. Heat exchanger 122 is a single continuous tube with no tubing joints or connections above the level of the burner. Advantageously, this structure dramatically improves reliability by removing potential points of failure that exist in the prior art. Tubing joints can cause leaks. Tubing joints can cause cracks. Tubing joints have crevices that can accumulate food particles and/or cooking oil deposits.

Figure 7:
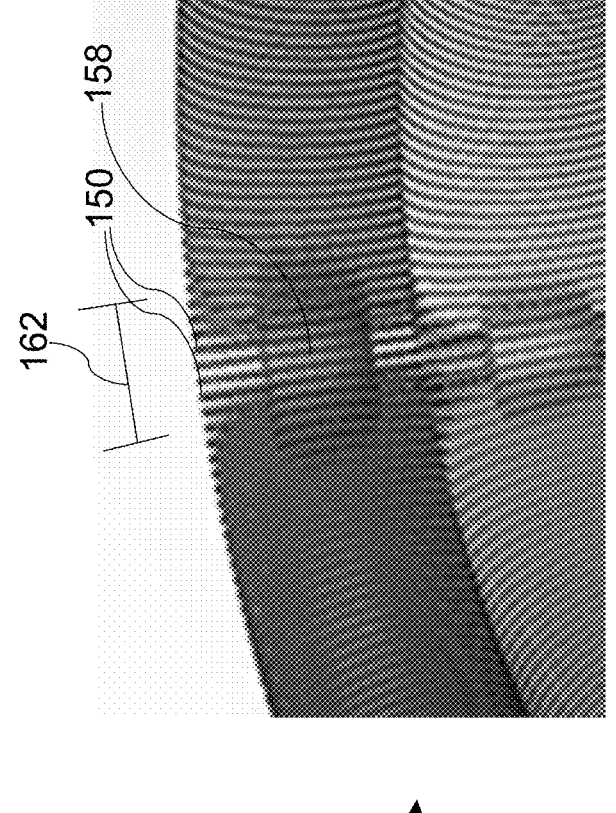
FIG. 7 is a partial perspective view of tubing of the heat exchanger.

Referring to FIG. 7, heat exchanger 122 can be a fin-tube coil heat exchanger, such as a double helix fin-and-tube heat exchanger. A fin-tube coil has a plurality of fins 150 that radially project from wall 158 and are spaced along a length 162 of the continuous tube to transfer heat from the hot combustion gases flowing over the outside of the tube coil to the cooler oil flowing through the inside of the coiled tube.

In example embodiments, the tube of heat exchanger 122 is cold rolled steel. The tube can have a protective coating. The coating can be nickel, copper, alloys thereof, and the like.

Fins 150 are of the same material as the tube. The tube and fins 150 are furnace brazed to each other. Such brazing enables good heat transfer.

The tube has a diameter of wall 158 that is from about 0.5 and about 1.5 inches, preferably from about 0.7 to about 1 inch, and more preferably from about 0.75 to about 0.95 inches, for example, 0.875 inches.

Fins 150 have a density of 12 fins per inch or 4.72 fins per cm. Fin density can range from 5 to 20 fins per inch, preferably from 8 to 18 fins per inch, and more preferably from 10 to 14 fins per inch.

Fins 150 are preferably from about 0.5 to about 0.9 mm thick, more preferably, from about 0.6 to about 0.8 mm thick, and most preferably from about 0.7 to about 0.8 mm thick, for example 0.76 mm thick.

Fins 150 have an outer diameter from about 0.125 inches to about 0.750 inches, preferably from about 0.250 inches to about 0.500 inches, and more preferably 0.300 inches to about_0.400_inches. For example, fins 150 can have an outer diameter that is about 0.375 inches (9.53 mm) from wall 158.

This higher fin density is not possible with prior art atmospheric burner systems but is possible with a forced-draft gas heating system. This high fin density allows heat exchanger 122 to be compact, taking up a minimal amount of space under oil vat 102. This compact size creates space for other components such as filter pumps, filter pan, and a fresh oil replenishment container. Heat exchanger 122 is compact enough to fit within a standard 14-inch-wide fry vat allowing for multiple independent frying systems in the same or less space that previous fryer systems with a larger heat exchanger.

Referring back to FIG. 6, heat exchanger 122 is disposed within wall 158 of containment structure 146. As shown, a single piece of finned tubing is wound to form four upward spiral revolutions to comprise the inner tubing section 132 followed by four downward spiral revolutions to comprise the outer tubing section 136.

Thus, this geometry creates a two-row coil of continuous tube that is four revolutions high, wrapping around burner 144. Inlet 120 and outlet 124 are positioned at the lowermost of the four revolutions communicating, respectively, with inner tubing section 132 and outer tubing section 136.

Because burner 144 is centered vertically inside heat exchanger 122 and the heat exchanger wraps around the burner multiple times, heat distribution to the cooking oil flowing therethrough is very even, eliminating the hot spot problem. Burner 144 can be a cylindrical burner.

Because heat exchanger 122 that is positioned in containment structure 146 is formed from one single continuous finned tube, there are no joints within the containment structure and the potential for joint failure caused by repeated thermal cycles during fryer operation is eliminated. This greatly increases the heat exchanger reliability. Further, both the oil entrance and exit to heat exchanger 122, inlet 120 and outlet 124 are located below burner 144. This ensures that no joints are exposed to the high temperatures near or above the burner.

Containment structure 146 is cylindrical and is proximate to or abuts outer tubing section 136.

In operation, fuel gas and air are provided to venturi 140 where they are combined to form an air-gas mixture. The fuel gas can be, for example, natural gas, liquified petroleum gas, or similar.

A gas valve 156 can be used to control a flow of the natural gas. The air-gas mixture flows through blower 138 through pipe 142 into burner 144 where the air-gas mixture is ignited and burned. The resultant hot exhaust gas from burner 144 flows radially within containment structure 146 into the lower inner and outer rows of heat exchanger 122, passing first over a lower half of inner tubing section 132 and then over a lower half of outer tubing section 136, as indicated by the arrows. The combustion products then flow vertically through the remainder of containment structure 146 and out flue 148 as exhaust gas.

This structure creates forced-draft system that permits much higher gas velocities than are possible with atmospheric burner systems.

The forced-draft burner system has a symmetrical radial flame that is directed evenly outward into the lower portion of heat exchanger 122 and is forced over the remainder of the finned coils for a highly-efficient heat transfer to the oil with no localized high temperature spots on the tube surfaces. Efficient heat transfer from the burner system through the heat exchanger 122 to the oil results in a low flue temperature in flue 148, typically less than 50° F. above the vat oil temperature. The compact design of the heat exchanger minimizes the internal oil volume allowing the oil to be quickly and evenly heated before being returned to the cooking zone at the front of the fry vat.

In operation, wall 158 of containment structure 146 serves as a containment structure to contain the exhaust gas flow coming from burner 144 to channel that gas into flue 148 and out the top of fryer 100. This exhaust gas containment prevents the hot gases from exiting into the bottom of fryer 100.

Advantageously, this forced-draft system structure combined with high fin densities on heat exchanger 122, results in a compact oil heating system that enables more uniform heat flux across the entirety of heat exchanger 122. Such a uniform heat flux eliminates hot spots inside heat exchanger 122 that can damage the oil flowing therethrough.

Because oil in vat 102 flows continuously from the front of the vat, upstream end 108, to the rear of the vat, downstream end 110, heat transfer to the food is maximized. Continuous oil flow through heat exchanger 122 and vat 102 promotes high heat transfer rates and minimizes the temperature gradient across the entire vat.

Oil flow keeps the flow in the vat turbulent, promoting even cooking since an oil temperature at a top of the vat will be virtually identical with an oil temperature at a bottom of the vat.

Oil flow rate can be adjusted. Pump 118 is variable speed and can be varied during a cooking cycle. When the fryer is not cooking and is in a "stand-by" or idle condition, the circulating pump, pump 118, can be shut off to save energy and reduce heat losses. Heating system 300 is also variable power so that the power can be matched to the flow rate to ensure oil will not be subject to excessive heat flux in heat exchanger 122.

By way of non-limiting example, an oil flow rate through heat exchanger 122 and vat 102 is ideally such that oil changes per minute in vat 102 are 0.5 to 5.0.

This structure provides significant advantages over prior convection frying systems. By varying heating power and oil flow, heating system 300 provides high efficiency heat transfer to the oil during both cooking and non-cooking times. When fryer 100 is idling and maintaining temperature, both the heating energy and the oil flow can be minimized to reduce heating losses and oil oxidation. This reduces operating costs and extends oil life.

What is claimed is:

1. A heating system for a fluid, the heating system comprising: a continuous tube having an inlet port at a first end of the tube, an outlet port at a second end of the tube, an inner coil portion and an outer coil portion, and a plurality of external radial fins spaced apart along a length thereof; and a burner in operative communication with a fuel line, wherein the burner has a longitudinal axis that is in a vertical orientation, wherein the inner coil section wraps around the burner in a vertical direction and the outer coil section wraps around the inner coil section in the vertical direction, so that the burner is centered inside the inner coil section and the inner coil section is between the outer coil section and the burner, the heating system further comprising a containment structure having a closed bottom end and a flue opening at an upper end, wherein the containment structure encloses the inner coil section, the outer coil section, and the burner, and the containment structure is positioned above the inlet port and the outlet port, wherein the burner heats the continuous tube to evenly transfer heat to the fluid while the fluid flows through the continuous tube from the inlet port to the outlet port.

2. The heating system of claim 1, wherein the containment structure is cylindrical and abuts the outer coil section.

3. The heating system of claim 1, wherein the burner is a radial burner.

4. The heating system of claim 1, wherein the continuous tube is jointless between the inlet port and the outlet port.

5. The heating system of claim 1, wherein the continuous tube has a fin density of 8 fins per inch to 15 fins per inch.

6. The heating system of claim 1, wherein the fins are spaced along the length of the continuous tube.

7. The heating system of claim 1, wherein the inner coil section and the outer coil section are formed from at least 3 revolutions of the continuous tube.

8. The heating system of claim 1, wherein the inner coil section and the outer coil section are formed from at least 4 revolutions of the continuous tube.

9. The heating system of claim 1, wherein the inlet port is in fluid level communication with a first valve communicating with a first drain pipe and wherein the outlet port is in fluid level communication with a second valve communicating with a second drain pipe, so that the continuous tube can be drained when both the first valve and the second valve are open.

10. The heating system of claim 1, wherein the burner is a forced-draft type burner.

11. The heating system of claim 1, wherein the inner coil section wraps around the burner in an upward vertical direction and the outer coil section wraps around the inner coil section in a downward vertical direction.

12. A convection oil fryer, the fryer comprising: a vat for cooking oil, the vat having a first end and a second end opposite the first end; a continuous tube having an inlet port at a first end of the tube, an outlet port at a second end of the tube, an inner coil portion and an outer coil portion, and a plurality of external radial fins spaced apart along a length thereof; and a burner in operative communication with a fuel line, wherein the burner has a longitudinal axis that is in a vertical orientation, wherein the inner coil section wraps around the burner in a vertical direction and the outer coil section wraps around the inner coil section in the vertical direction, so that the burner is centered inside the inner coil section and the inner coil section is between the outer coil section and the burner, the heating system further comprising a containment structure having a closed bottom end and a flue opening at an upper end, wherein the containment structure encloses the inner coil section, the outer coil section, and the burner, wherein the containment structure is positioned above the inlet port and the outlet port; and a pump circulating cooking oil from the first end of the vat to the inlet port of the continuous tube and from the outlet of the continuous tube to the second end of the vat in a continuous loop, wherein the burner heats the continuous tube to evenly transfer heat to the cooking oil while the cooking oil flows through the continuous tube from the inlet port to the outlet port so that heated cooking oil circulates back.

13. The convection oil fryer of claim 12, wherein the containment structure is cylindrical and is proximate the outer coil section.

14. The convection oil fryer of claim 12, wherein the burner is a radial burner.

15. The convection oil fryer of claim 12, wherein the continuous tube is jointless between the inlet port and the outlet port.

16. The convection oil fryer of claim 12, wherein the continuous tube has a fin density of 8 fins per inch to 15 fins per inch.

17. The convection oil fryer of claim 12, wherein the fins are spaced along the length of the continuous tube.

18. The convection oil fryer of claim 12, wherein the inner coil section and the outer coil section are formed from at least 3 revolutions of the continuous tube.

19. The convection oil fryer of claim 12, wherein the inner coil section and the outer coil section are formed from at least 4 revolutions of the continuous tube.

20. The convection oil fryer of claim 12, wherein the inlet port is in fluid level communication with a first valve communicating with a first drain pipe and the outlet port is in fluid level communication with a second valve communicating with a second drain pipe, so that the continuous tube can be drained when both the first valve and the second valve are open.

21. The convection oil fryer of claim 12, wherein the burner is a forced-draft type burner.

* * * * *